US011552870B2

(12) United States Patent
Arneja

(10) Patent No.: US 11,552,870 B2
(45) Date of Patent: Jan. 10, 2023

(54) DYNAMIC PROFILE GUIDED NETWORK TELEMETRY CONFIGURATION

(71) Applicant: Arista Networks, Inc., Santa Clara, CA (US)

(72) Inventor: Gagandeep Arneja, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 69 days.

(21) Appl. No.: 17/130,692

(22) Filed: Dec. 22, 2020

(65) Prior Publication Data

US 2022/0200882 A1 Jun. 23, 2022

(51) Int. Cl.
*H04L 43/0876* (2022.01)
*H04L 43/062* (2022.01)
*H04L 47/11* (2022.01)
*H04L 41/0803* (2022.01)

(52) U.S. Cl.
CPC ...... *H04L 43/0876* (2013.01); *H04L 41/0803* (2013.01); *H04L 43/062* (2013.01); *H04L 47/11* (2013.01)

(58) Field of Classification Search
CPC ............. H04L 43/0876; H04L 41/0803; H04L 43/062; H04L 47/11; H04L 67/34
See application file for complete search history.

(56) References Cited

U.S. PATENT DOCUMENTS

2017/0118102 A1* 4/2017 Majumder .......... G06F 9/45533
2017/0324632 A1* 11/2017 Arora .................. H04L 43/0852

* cited by examiner

*Primary Examiner* — Pankaj Kumar
*Assistant Examiner* — Eric Phu
(74) *Attorney, Agent, or Firm* — Fountainhead Law Group P.C.

(57) ABSTRACT

Systems and methods for automatically configuring network elements for in-band telemetry are disclosed. A controller of a configuration engine, which includes a flow analyzer and an INT configuration module, receives sampled packets and flow updates from network elements that are not yet configured for INT telemetry. The controller forwards the packets to the flow analyzer that extracts flow properties from the received packets, generates a flow summary along various metrics, and records it in a multi-dimensional matrix. A few metrics from top flows are selected and forwarded to the INT configuration module to identify network elements from whom packets containing the selected metrics were received. The identified network elements are automatically configured with the selected INT configuration such that INT telemetry data can be collected from them. Changes to the flow are dynamically accommodated by reconfiguring the network elements based on the telemetry data received after they have been configured.

20 Claims, 9 Drawing Sheets

| Switch ID# | INT Source SW120 | Switch SW 132 | Switch SW 134 | Switch SW 136 | Switch SW 138 | INT Sink SW 160 |
|---|---|---|---|---|---|---|
| Latency Meta Data of Packet 510 at Switch | 6 ms | 7ms | 12ms | 6ms | 7ms | 5ms |

DYNAMIC PROFILE GUIDED NETWORK TELEMETRY CONFIGURATION

FIELD OF INVENTION

Embodiments of the present invention relate to automatically configuring network elements for in-band telemetry.

BACKGROUND OF INVENTION

Real-time collection of data in a network from data sources, also referred to as network telemetry or telemetry, is vital to monitoring traffic flow in a network and troubleshooting issues relating to congestion, latency, jitter, packet loss rate and bandwidth.

In-band telemetry (also referred to as "in-band network telemetry" or "INT") is a type of telemetry mechanism used for collecting data in real-time and reporting the data for monitoring and analysis. The mechanism allows collection of data directly from the data plane without involving the control plane. A core function of INT is to trace the path of a packet and report the state of the packet as it travels along its path to its destination. INT operates by embedding a set of instructions into a packet header at the INT source. The instructions define the type of telemetry data to be collected at each network element that the packet passes along its path to its destination. The network element is configured to follow the set of instructions and inserts metadata that corresponds to the instructions into the INT header. The data collected is reported to a collector and used to build a network state of each network element thereby allowing network operators to monitor the network and address any network issues.

Current INT mechanisms have several limitations. For example, one type of INT mechanism requires network switches to be manually and statically configured. Using this approach, each switch in the network is manually configured with rules for collecting a certain pre-selected subset of flows and type and quantity of data from packets of those flows. Since traffic patterns change rapidly in a network, faced with the manual limitation, such systems are not capable of rapidly changing rules to accommodate the changed traffic patterns and as such cannot keep pace and adapt to traffic changes. The data collected through these systems is therefore lagging and not representative of the current status of network flow.

Another known INT mechanism to measure traffic flow is flow sampling. Systems deploying such mechanisms pseudo-randomly copy selected packets that match configured rules at switches and forward them to a Central Controller. These mechanisms lack adequate representation of traffic flow as they either copy too many packets resulting in heavy storage and/or processing requirements or too few packets resulting in a large gap in data to truly analyze the traffic flow.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 6 is a block diagram of a packet latency table, in accordance with some embodiments of the disclosure;

DETAILED DESCRIPTION

Figure 1:
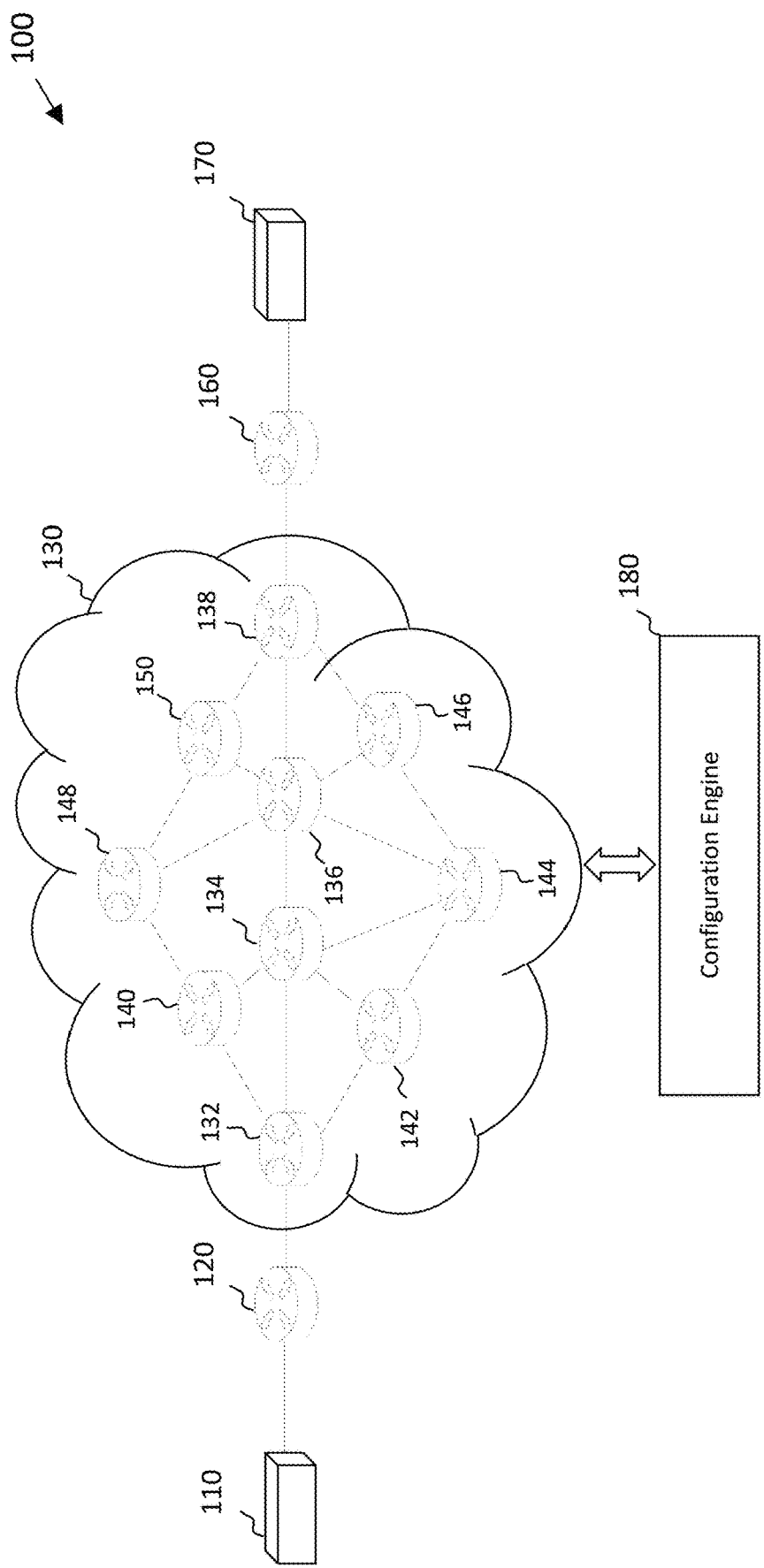
FIG. 1 shows a system for collecting packets data and configuring a network element for in-band telemetry, in accordance with some embodiments of the disclosure.

In accordance with some disclosed embodiments, a system and method for automatically configuring in-band network telemetry is described. A configuration engine receives packets and packet flow data from each network element in the network. Specifically, a flow reporting module associated with each network element collects packets and packet flow data and sends it to a controller of the configuration engine. It may also send a flow report, which is a report generated by the flow module that summarizes a plurality of packet characteristics collected by the flow reporting module. At this stage, the network elements have not been configured for in-band telemetry, also referred to herein as a first stage configuration where the network elements may have been configured for something other than in-band telemetry.

The packets and packet flow data received at the controller of the configuration engine are processed and then utilized to automatically configure one or more first stage configured network elements. The network elements configurations are continuously and dynamically updated based on changes in network traffic.

To accomplish the automatic configuration (and re-configuration as needed), a configuration engine having a controller, flow analyzer, and an in-band telemetry configuration module is provided. The configuration engine receives data from a plurality of first stage configured network elements that are part of a network. The network elements, which are not configured for telemetry at this stage, include a flow reporting module. Packet and flow data are collected by the flow reporting modules and forwarded to the controller of the configuration engine.

The controller receives the packet and flow data and forwards it to the flow analyzer for further processing. The flow analyzer extracts flow properties from the packet header and then calculates metrics for each of the flow properties. The flow analyzer uses flow properties and metrics to generate a multi-dimensional flow matrix that is representative of the current network flow. The multi-dimensional flow matrix represents flow patterns through all the network elements in the network. The multi-dimensional flow matrix includes flow properties (e.g., Source IP address, Destination IP address, Source Port, Destination Port, VLAN, or VXLAN VNI), flow metrics (e.g., jitter, packet loss, latency, queue length, and bandwidth utilization), and time intervals at which the flow was measured and calculated. The matrix is updated continuously based on ongoing flow of data received from the flow reporting modules.

The Flow Analyzer scans all the matrices that are recorded in the multi-dimensional flow matrix on a periodic basis and selects top N Metrics for each flow property. The Top N Metrics and their associated flow property is forwarded to the In-Band Telemetry Configuration module for generating an INT configuration that allows tracking of the desired flow property along the Top N Metric. The configuration engine maps the flow property with one or more first stage configured network elements from which packets with the flow property were received.

Once the first stage configured network elements are identified, the In-Band Telemetry Configuration module automatically configures first stage configured network elements with one or more INT rules which converts them into second stage configured network elements. The second stage refers to network elements that have been configured for telemetry. The network element, now having been configured with the INT rules, copies packet and flow data in accordance with the configured INT rules and sends the data relating to the flow property to the controller.

The configured network elements are continuously monitored by the controller. If a change in traffic flow is detected, the configuration is updated to match the traffic flow and the network element is reconfigured. For example, if a configuration was designed to monitor congestion at a network and the congestion no longer exists, then the configuration is matched to another metric, such as jitter, that may need to be monitored instead of congestion. Likewise, if the network element is no longer in use or part of the network, then the INT configuration applied to the network element is removed.

The disclosed embodiments and methods also allow identification of services in the network leading to a customized configuration for enhanced monitoring of flows relating to the service. For example, by aggregating the number of unique flows seen over time per destination, such as to port 53, it may be determined that a particular TCP/UDP port commonly uses a DNS service.

Since packet flow for a DNS service is usually lightly loaded volumetrically, enough packets need to be captured within a shorter frequency in order to get an accurate representation of the flow. In the absence of a customized INT configuration, pseudo randomly copying the same number of packets, or pseudo randomly capturing at the same frequency as in a heavily loaded flow would result in large gaps that would not represent the lightly loaded flow. As such, customized INT configurations, as disclosed in some of the embodiments, can be automatically generated and applied to network elements that are associated with the packet flow for the DNS service.

FIG. 1 shows an exemplary system environment 100 for collecting packets and packet flow data configuring a network element for in-band telemetry, in accordance with some embodiments of the disclosure. The system 100 includes a host 110, a first network element 120, a network 130 of plurality of network elements 132, 134, 136, 138, 140, 142, 144, 146, 148, 150, a last network element 160, and a receiver 170. The plurality of network elements 132, 134, 136, 138, 140, 142, 144, 146, 148, 150 are connected to a configuration engine 180 through network 130.

Although a certain number of network elements, and routes between the network elements are depicted, the system 100 for collecting packet flow data and configuring a network element is not so limited. It is understood that other types of network topologies that include different combination of network elements and links, e.g., greater or fewer number of network elements, subnets, routers, and switches than shown in FIG. 1, may be employed to collect packet data and configure a network element.

The network may include a host 110 and a first network element 120 or a combination of other devices at the ingress point. For example, the network may include an edge element, a hub, servers or devices, or other network elements, that connect to the first network element 120.

The host 110, also referred to as the source, may be a computer, mobile device, or other electronic device capable of connecting to the first network element and/or to the network 130.

The first network element 120 may act as the ingress point or the first hop for a packet that is sent from source 110 and destined for receiver 170. The first network element 120 can each be a switch, router, hub, bridge, gateway, etc., or other types of packet-forwarding device that can communicate with network 130. In one embodiment, the first network element 120 can be a virtual machine.

The network 130 includes a plurality of network elements 132, 134, 136, 138, 140, 142, 144, 146, 148, 150. These network elements 132, 134, 136, 138, 140, 142, 144, 146, 148, 150 can be a switch, router, hub, bridge, gateway, virtual machine or other type of packet receiving and forwarding device. The plurality of network elements 132, 134, 136, 138, 140, 142, 144, 146, 148, 150 are connected to each other and the first hop network element 120 and the last hop network element 160 are connected through network 130. The last hop network element 160 is capable of removing packet headers and forwards the packet to the receiver 170.

Each network element 120, 132, 134, 136, 138, 140, 142, 144, 146, 148, 150, 160 is initially configured for receiving and forwarding packets, also referred to as having a first stage configuration for which there is no in-band telemetry configuration. Each network element 120, 132, 134, 136, 138, 140, 142, 144, 146, 148, 150, 160 includes a flow reporting module. Alternatively, a flow reporting module may be shared between multiple network elements. As a packet travels through each network element, the flow reporting module gathers packet data and stores it in the network element's memory. Packet data, for example, includes packet time stamps at ingress and egress points of the network element, path information, latency information, jitter, bandwidth utilization, queue depth, and other packet related data.

In one embodiment, the flow reporting module pseudo randomly selects packets as they travel between the network element's ingress and egress points. Packet data for the pseudo randomly selected packets is captured by the flow reporting module and stored in the network element memory. In another embodiment, the flow reporting module periodically collects packet data and maintains the packet data in a flow table stored in the memory of the network element.

Each network element 120, 132, 134, 136, 138, 140, 142, 144, 146, 148, 150, 160 sends the packet data and/or flow table 211 to the configuration engine 180. The packet data and/or flow table 211 represents the status of the packet and packet flow when it was processed by the network element.

Figure 2:
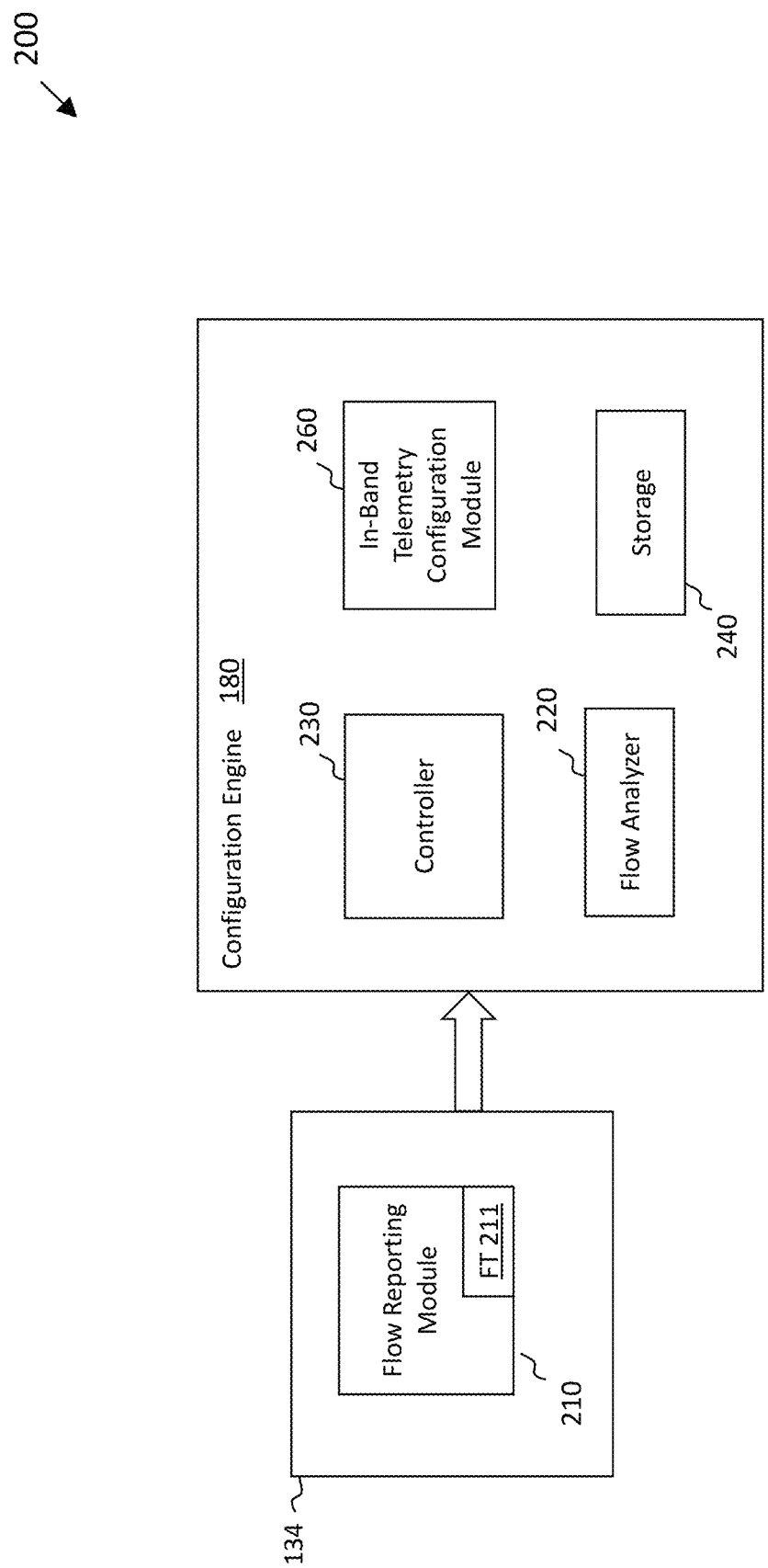
FIG. 2 is a block diagram of a system for generating an INT configuration, in accordance with some embodiments of the disclosure.

The configuration engine 180 is configured to receive packet data and/or flow table 211 and process the data as further described in FIG. 2.

The network 130 can be a wired or wireless network. It may be a local area network, wide area network, a virtual private network, or another type of network that provides the capability to collect and report packet and packet flow data. It may also be an Ethernet connection. The configuration engine 180 may connect to the network through a variety of means (e.g., through an interface such as RS-232 or other wired, wireless, and digital or analog means).

The configuration engine 180 may be configured to receive data from all network elements 120, 132, 134, 136, 138, 140, 142, 144, 146, 148, 150, 160 in network 130. Alternatively, the configuration engine 180 may be configured to receive data from a select number of network elements that are along the path of a desired packet flow.

FIG. 2 is a block diagram of a system for generating an INT configuration, in accordance with some embodiments of the disclosure. In one embodiment, the system 200 includes network elements 120, 132, 134, 136, 138, 140, 142, 144, 146, 148, 150, 160 and a configuration engine 180. For exemplary purposes, representative network element 134 from the plurality of network elements 120, 132, 134, 136, 138, 140, 142, 144, 146, 148, 150, 160 is discussed below.

Network element 134 can be a switch, router, hub, bridge, gateway, virtual engine or other type of packet receiving and forwarding device that can communicate with other network elements 120, 132, 134, 136, 138, 140, 142, 144, 146, 148, 150, 160 through network 130.

In one embodiment, network element 134 has been configured with a stage one or first stage configuration, i.e., it can receive and forward packets, however it has not yet been configured for provisioning in-band network telemetry data (or INT data). Network element 134 includes a flow reporting module 210, which may be a software component that is loaded onto the network element 134. The functional steps taken by the flow reporting module 210 may be executed by a processor of the network element 134. Alternatively, the flow reporting module 210 may be a hardware component that is integrated or coupled to network element 134. It may also be part of a separate device that connects to the network element 134 through wired or wireless means.

In one embodiment, flow reporting module 210 monitors traffic through network element 134. It does so by pseudo randomly selecting packets that pass through the network element 134 and sending them to the controller 230. It may also make a copy of the packet and send the copy to the controller 230. Additionally, it may augment the packet with metadata from the control plane before sending it to the controller 230.

The flow reporting module 210 collects packet data, such as, time stamps, latency, source and/or destination IP address, and sends the packet's header, some fixed amount of packet data payload, and optionally any additional metadata to the controller 230. The packet data collected provides visibility into one or more dimensions of the packet that can be used by the configuration engine 180 to determine in-band telemetry configurations.

In another embodiment, flow reporting module 210 maintains a flow table (FT 211) and periodically sends flow table updates of the flow table to the controller 230. The flow table can be maintained in hardware or software. A flow table update includes information relating to a list of flows seen over a certain period of time.

In one embodiment, system 200 includes a configuration engine 180 that further includes a plurality of sub-modules, such as, flow analyzer 220, a controller 230, storage 240, and In-band telemetry configuration module 260. The configuration engine 180 can be a separate device that connects to the network element 134 (and other network elements 120, 132, 134, 136, 138, 140, 142, 144, 146, 148, 150, 160) through the network 130. Although four sub-modules 220, 230, 240, 260 are depicted, the submodules may be integrated to a lesser number of sub-modules, or just one module that provides the functionality of all the sub-modules 220, 230, 240, 260. One or more sub-modules 220, 230, 240, 260 may either be a part of the configuration engine 180 or be part of a separate device that connects to the configuration engine 180. One or more sub-modules 220, 230, 240, 260 may also be a software component that is loaded onto the configuration engine 180 and functions performed by the sub-modules 220, 230, 240, 260 may be directed by a processor of the configuration engine 180.

The controller 230 continuously receives packets, copies of packets, metadata from packets, or flow reports from the flow reporting module 210 from all network elements in the network 130. In some cases, each network element includes its own flow reporting module and in other cases a flow reporting module is shared between multiple network elements. The data received by the controller 230 from flow reporting module 210 is stored in the storage device 240.

The flow analyzer 220 accesses the data stored in storage module 240 and generates a flow summary. Alternatively, the packets or flow reports received at the controller 230 are directly fed to the flow analyzer 220. Since a flow reporting module 210 from each network element 120, 132, 134, 136, 138, 140, 142, 144, 146, 148, 150, 160 sends packets, copies of packets, metadata from packets, or flow reports, the flow summary generated by the flow analyzer is representative of packet flow across the network 130 at a given time, e.g., time t=0, or some other time that can be determined by the timestamps at which the packets were received by the flow analyzer.

In one embodiment, the flow analyzer 220 extracts flow properties from the packet header and then calculates metrics for each of the flow properties. Some examples of the metrics include jitter, packet loss, latency, queue length, and bandwidth utilization. The flow analyzer uses these flow properties and metrics to generate a flow summary. This flow summary can be recorded in a multi-dimensional matrix.

Figure 3:
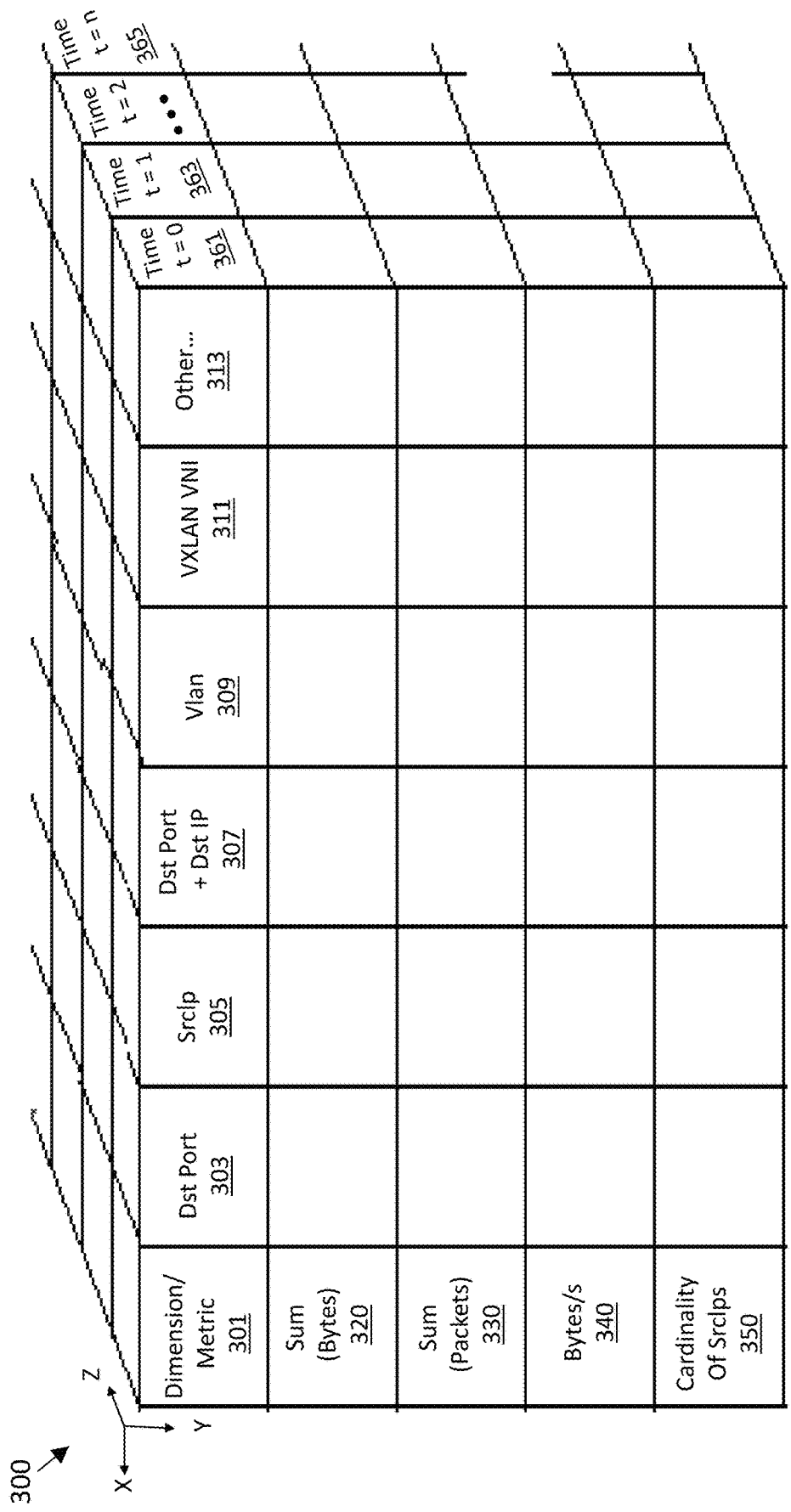
FIG. 3 is a block diagram of a flow summary recorded in a multi-dimensional matrix, in accordance with some embodiments of the disclosure.

FIG. 3 is an exemplary flow summary generated by the flow analyzer 220 that is recorded in a multi-dimensional flow matrix and stored in storage 240 of the configuration engine 180 in accordance with some embodiments of the disclosure. Although a 3-dimensional matrix is represented in FIG. 3, fewer or more dimensions are also contemplated. The multi-dimensional flow matrix 300, which is constructed from the flow summary, is representative of the packet flow through the entire network 130.

Along its X-Axis, the multi-dimensional flow matrix 300 includes flow properties 303, 305, 307, 309, 311, 313 (e.g., Source IP address, Destination IP address, Source Port, Destination Port, or VXLAN VNI). It may also include other 313 flow properties, such as next hop address. Although flow properties 303, 305, 307, 309, 311, 313, also referred to as dimensions or headers, are displayed individually in the multi-dimensional flow matrix 300, a flow property may be a combination of one or more flow properties, such as packets that have the same source and destination IP address may be grouped together as one flow property.

Along its Y-Axis, the multi-dimensional flow matrix 300 includes a plurality of metrics, such as Sum (Bytes) 320, Sum (packets) 330, Bytes 340, and Cardinality of Source IP addresses 350 for a given destination port.

The Z-axis of the multi-dimensional flow matrix 300 represents a given time period during which packets, copies of packets, metadata from packets, or flow reports from the flow reporting module 210 were received by the controller 230 from all network elements 120, 132, 134, 136, 138, 140, 142, 144, 146, 148, 150, 160 in the network 130. The given time period may either be the time at which packets were sent from each network device, a time at which the packets were received by the configuration engine, or a time at which the multidimensional matrix was generated for the received packets.

In one embodiment, the front-most slice of the multi-dimensional flow matrix 300 represents the state of packet flow at time t=0 (361). Since the controller 230 continuously receives packets, copies of packets, metadata from packets, or flow reports from the flow reporting modules 210, the Z-axis represents each point in time, such as time t=1 (363), time t=2, and time t=n (365), at which the flow summary was generated thereby giving a snapshot of the flow through the network 130 over multiple points in time.

The points in time used in the multi-dimensional flow matrix can be selected by the flow analyzer 220. The duration between points in time can be the same duration or for different durations. For example, the time t=1 can be 1 second, time t=2 can be 1 minute, and time t=3 can be 1 day. The flow analyzer 220 can select any time duration and simultaneously generate flow summaries for various time periods.

Since the multi-dimensional flow matrix 300 is constantly changing over various points in time, it is constantly updated and represents the most current state of packet flow in the network. At times the multi-dimensional flow matrix 300 changes at pre-defined intervals and at times it changes any time a change in network flow is detected.

Referring back to FIG. 2, the flow analyzer 220 scans all flow properties and metrics from its flow summary and selects the top N metrics for each flow property. For example, of the several packets flows in the network, if a majority of the traffic is directed to a specific destination port, then the traffic going to that destination would be identified as one of the top flows in the network.

By selecting the top N metrics, where the N metric represents a service, the flow analyzer 220 can identify services in the network. This leads to a customized configuration that is designed for the specific service thereby allowing for enhanced monitoring of flows relating to the specific service. For example, if the top traffic flows in the network are destined for a port that is associated with Domain Name Server (DNS), then the flow analyzer is able to identify that a DNS service is being utilized.

Flow Analyzer 220 continues to scan all flow properties and metrics from its flow summary, at a predetermined interval or upon a change detected in the network traffic, and continues to select its top N metrics for each time period, such as at time t=0 (361), t=1 (363), and t=n (365). By doing so, the top N metrics continue to evolve and change and follow the changes in the traffic flow.

The Top N Metrics selected, and their associated flow property, is forwarded to the In-Band Telemetry Configuration module 260 for generating an INT configuration. The In-Band Telemetry Configuration module 260 generates a configuration that is specific to the N metrics and their associated flow property. The configuration consists of telemetry rules that direct a network element to provision traffic based on the provided telemetry rules and forward only those packets that match the telemetry rules to the controller 230.

The In-Band Telemetry Configuration module 260 performs an analysis to determine from which one or more network elements, from the plurality of all the network elements 120, 132, 134, 136, 138, 140, 142, 144, 146, 148, 150, 160 in the network 130, was the flow property received. It may be the case that the flow property was received from the flow reporting modules of a smaller subset of network elements, such as for example network elements 132, 134, 136, and 138. Following this example, the configuration engine maps the flow property with the smaller subset of network elements, such as for example network elements 132, 134, 136, and 138, and configures the smaller subset of network elements with a specific in-band network telemetry (INT) rule(s) that are customized based on the N metrics and associated flow property. As such, the network element is transformed from a first stage configuration (not configured for telemetry), to a second stage configuration (configured for in-band telemetry).

The network element, now having been configured to a second stage configuration with the INT rules, copies packet and flow data in accordance with the configured INT rules and sends the data relating to the flow property and Top N Metrics to the controller 230. As mentioned earlier, by aggregating the number of unique flows seen over time per destination, such as to port 53, it may be determined that a particular TCP/UDP port commonly uses a DNS service. Since packet flow for a DNS service is usually lightly loaded volumetrically, customized INT configurations can be automatically generated and applied to network elements that are associated with the packet flow for the DNS.

The configured network elements are continuously monitored. If a change in traffic flow is detected, the configuration is updated to match the traffic flow and the network element is reconfigured. Likewise, if the network element is no longer in use or part of the network, then the INT configuration applied to the network element is removed.

Figure 4A:
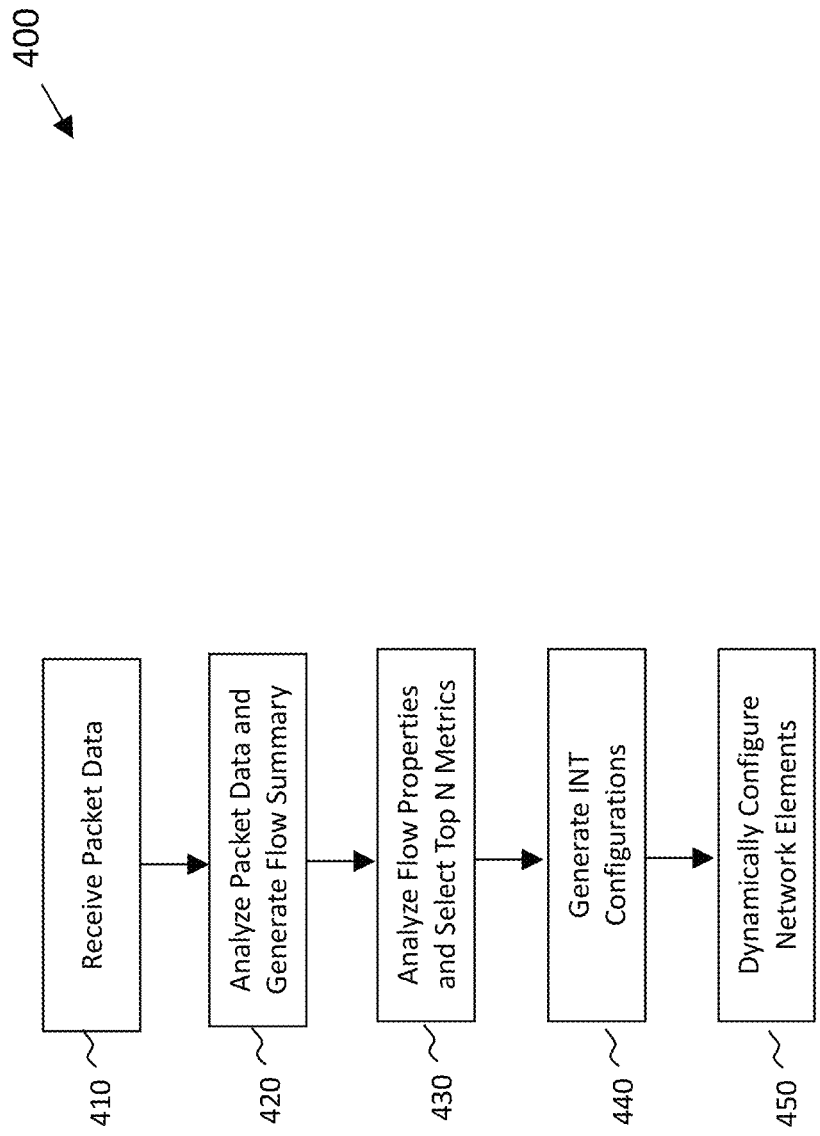
FIG. 4A is a flowchart of a process for configuring a network element, in accordance with some embodiments of the disclosure.

FIG. 4A shows an exemplary flowchart of a process 400 for configuring a network element for telemetry, in accordance with some embodiments of the disclosure. The process 400 uses the systems described in FIGS. 1 and 2, as well as the flow summary recorded in the multi-dimensional flow matrix 300 of FIG. 3. The process 400 may be performed by a control circuitry and systems as described in FIG. 8 below.

At Step 410, packet related data, e.g. packets, copies of packets, metadata from packets, or flow reports, are received by the controller 230. The packet related data is sent from each first stage configured network element 120, 132, 134, 136, 138, 140, 142, 144, 146, 148, 150, 160 in the network 130, through its flow reporting module 210, to the controller 230. At the first stage configuration level, the network elements 120, 132, 134, 136, 138, 140, 142, 144, 146, 148, 150, 160 have not been configured for telemetry. The packet data received by the controller 230 represents the current state of traffic flow in the network.

At Step 420, the flow analyzer 220 analyses packet data and generates a flow summary. The controller 230 forwards the received packet data to the flow analyzer 220. The packets include a plurality of packet headers, also referred to as dimensions or flow properties, that provide details relating to the packet. The packet data is analyzed and packets are parsed into groups, such as grouped by their flow properties. The flow analyzer 220 extracts flow properties from the packet header and calculates metrics for each of the flow properties. Flow properties may include Source IP address, Destination IP address, Source Port, Destination Port, or VXLAN VNI or other flow property that provides information related to the packet. For example, Destination Port 303, may be a flow property that is extracted from the packet header and used to calculate the Sum Packets 330 for that destination port 303.

The flow analyzer uses flow properties and calculated metrics to generate a flow summary that is representative of the current network flow. The flow summary is recorded into a multi-dimensional flow matrix 300, such as the matrix shown in FIG. 3. Alternatively, the flow summary may also be recorded in other forms instead of the multi-dimensional flow matrix described above. As the controller 230 continues to receive new packet data, the multi-dimensional flow is updated and changed to incorporate the new packet data received and reflect the most current state of the network.

In one embodiment, flow analyzer calculates M metrics, where M is a number that represents all the metrics for all the packet data received by the controller. Alternatively, M represents a number greater than N. The metrics calculated may include jitter, packet loss, latency, queue length, and bandwidth utilization or other metrics that were calculated from the packet data.

As mentioned above, at Step 420, the flow analyzer 220 analyses the flow properties from the flow summary recorded in the multi-dimensional flow matrix 300. As part of its analysis, the flow analyzer 220 identifies patterns to identify important or key services in the network, their utilization, and how the services are being accessed. For example, the analysis may identify network flow patterns for both high network flow and low network flow, flow pattern that utilize a particular service, such as DNS, flow patterns that use a particular protocol, flow patterns that are destined for specific ports, such as TCP or UDP, a plurality of subnets that are accessing the same service (e.g., streaming service, access to a human resources portal), flow patterns that use certain autonomous system (AS) prefixes for external IP addresses, and other services that are business critical cloud services.

Since the matrix provides a snapshot of all (or several) packet flows in the network 130, the flow analyzer 220 selects only the top N metrics such that specific rules that are customized to the top N metrics can be developed by the INT configuration module. For example, after analyzing the snapshot of the packet flows in the network, the flow analyzer 220 may identify an important service being utilized and that packets to that destination are being dropped due to bandwidth constraints. As such, flow analyzer 220 may select packets drop and bandwidth utilization as the metrics such that the INT configuration module can develop customized rules to monitor packet traffic for packet drops and bandwidth issues for troubleshooting.

Once the N metric(s) is/are selected, at Step 430, the top N metrics, and associated flow properties, are forwarded to the In-Band Telemetry Configuration module ("INT Module") for generating an INT configuration that allows tracking of the desired flow property along the top N metrics. The configuration engine maps the flow property with one or more first stage configured network elements from whom packets with the flow property were received.

Figure 4B:
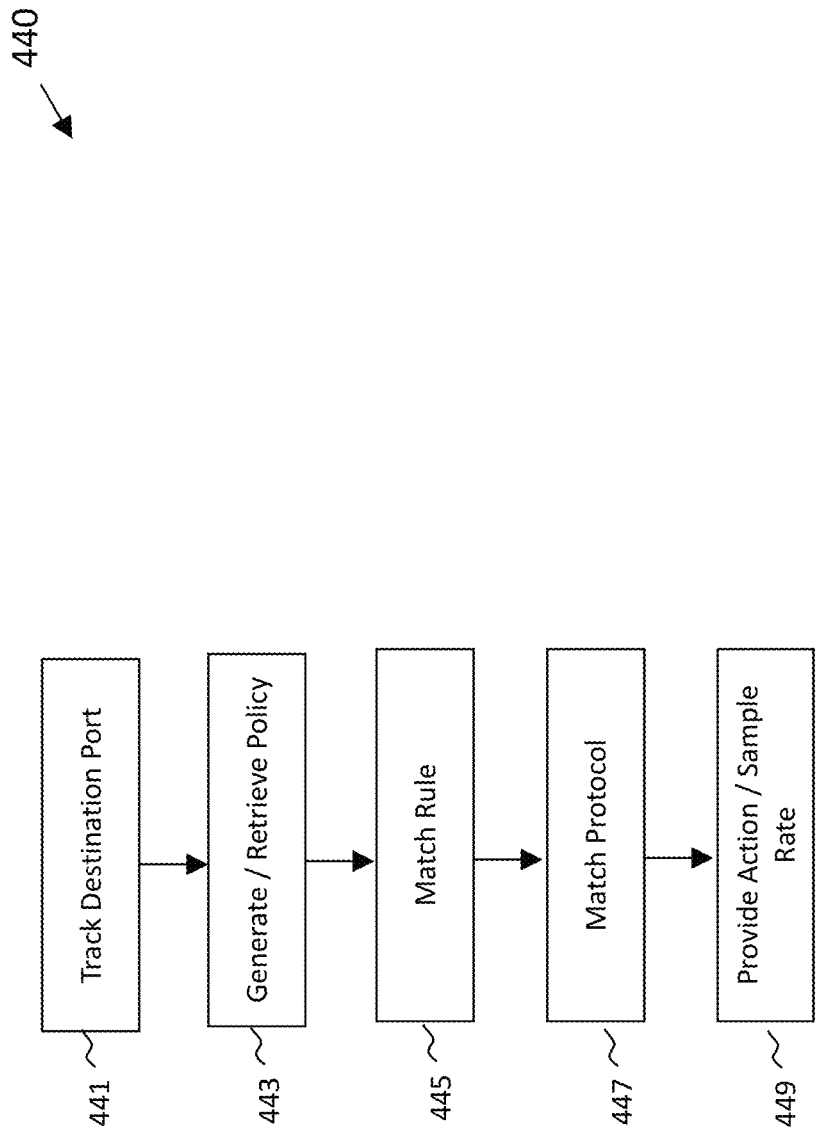
FIG. 4B is a flowchart of generating an INT configuration, in accordance with some embodiments of the disclosure.

At Step 440, once the first stage configured network elements are identified, the INT Configuration Module 260 generates an INT configuration and automatically configures the first stage configured network elements with the generated INT rules configuration and converts them into second stage configured network elements. FIG. 4B is a flowchart of generating an INT configuration, in accordance with some embodiments of the disclosure. At step 441, the destination port of a packet that includes the selected N metrics from step 430 is tracked. At step 443, the INT Configuration Module 260 generates a policy (or retrieves an existing policy) that is applicable to the packet. For example, the INT Configuration Module 260 may generate a policy and name is "generated-policy-1234," or any other name it desires. At step 445, INT Configuration Module 260 generates a rule that is specific and based on the metric to be tracked. At Step 447, the INT Configuration Module 260 also matches the protocol of the packet, such as TCP or UDP. At Step 449, the INT Configuration Module 260 provides an action, such as a sample rate at which telemetry data is to be collected. The sample rate can be as desired, e.g., sample every packet, alternate packet, or 1 out of every 1024 UDP packets that have a destination port 53. The steps above can be performed by a controller entering CLI commands or by a network element calling an API that mirrors the CLI commands.

As described in FIG. 4B, one example of a configuration generated as follows:

```
policy <policy-name>
    match <rule-name> ipv4
            source prefix <A.B.C.D/E>
            destination prefix <A.B.C.D/E>
            protocol tcp [ source port <port-list> ] |
                        [ destination port <port-list> ] |
            protocol udp [ source port <port-list> ] |
                        [ destination port <port-list> ]
            actions
                    sample rate <rate>
```

In another example, in a Domain Name Server (DNS) service where 1 out of every 1024 UDP packets that have destination port 53 is to be selected as the sample rate for obtaining telemetry, the following configuration can be generated:

```
policy generated-policy-1234
    match generated-rule-5678 ipv4
        protocol udp destination port 53
        actions
                sample rate 1024
```

Referring back to FIG. 4A, at Step 450, the generated configuration in FIG. 4A is dynamically applied to only those network elements from whom packets with the selected metric were received by the controller 230 (as described in FIG. 2). Once the network elements have been configured, the network elements are converted from first stage configuration (not being configured for INT telemetry) to a second stage configuration (configured for INT telemetry).

The configured second stage network element, now having been configured with the INT rules, copies packets and/or metadata from the packets at a sample rate in accordance with the configured INT rules and sends the data relating to the flow property to the controller 230. The configured second stage network element may also be further configured to a third stage where the configuration is updated or where the prior configuration is removed due to inactivity or if the need to monitor the network element no longer exists.

The N metric selected for the configuration, in one embodiment, relates to high volume, or heavy-hitter traffic flow, such as a streaming video, then the INT module 260 automatically and dynamically generates an INT configuration that addresses the high-volume flow by directing the network element to obtain a certain sequence of packets to get an enhanced representation of the traffic flow.

In another example, if the N metric relates to a lower traffic flow, such as for a Domain Name Server (DNS), then the INT module 260 automatically and dynamically generates an INT configuration to direct the associated network elements to copy all packets with DNS headers, or a predetermined number of packets, such as 1 out of every 1024 packets, to provide an accurate representation of the flow that is being monitored.

Customized INT rules may also be developed for N metrics that relate to flow patterns that use a particular protocol, flow patterns that are destined for specific ports, such as TCP or UDP, a plurality of subnets that are accessing the same service (e.g., streaming service, access to a human resources portal), flow patterns that use certain autonomous system (AS) prefixes for external IP addresses, and flow pattern that use services that are business critical cloud services.

Once an INT configuration is applied to one or more network elements, where the INT configuration includes customized INT rules based on the flow property and metrics selected, the network element copies only those packets that meet the criteria specified in the INT rules and sends those packets to the controller 230 such that customized flow data can be obtained leading to better network troubleshooting and enhanced performance. Once the INT configuration is applied to the network element, the configuration may be automatically updated, or removed, as packet flow and network needs change.

Figure 5:
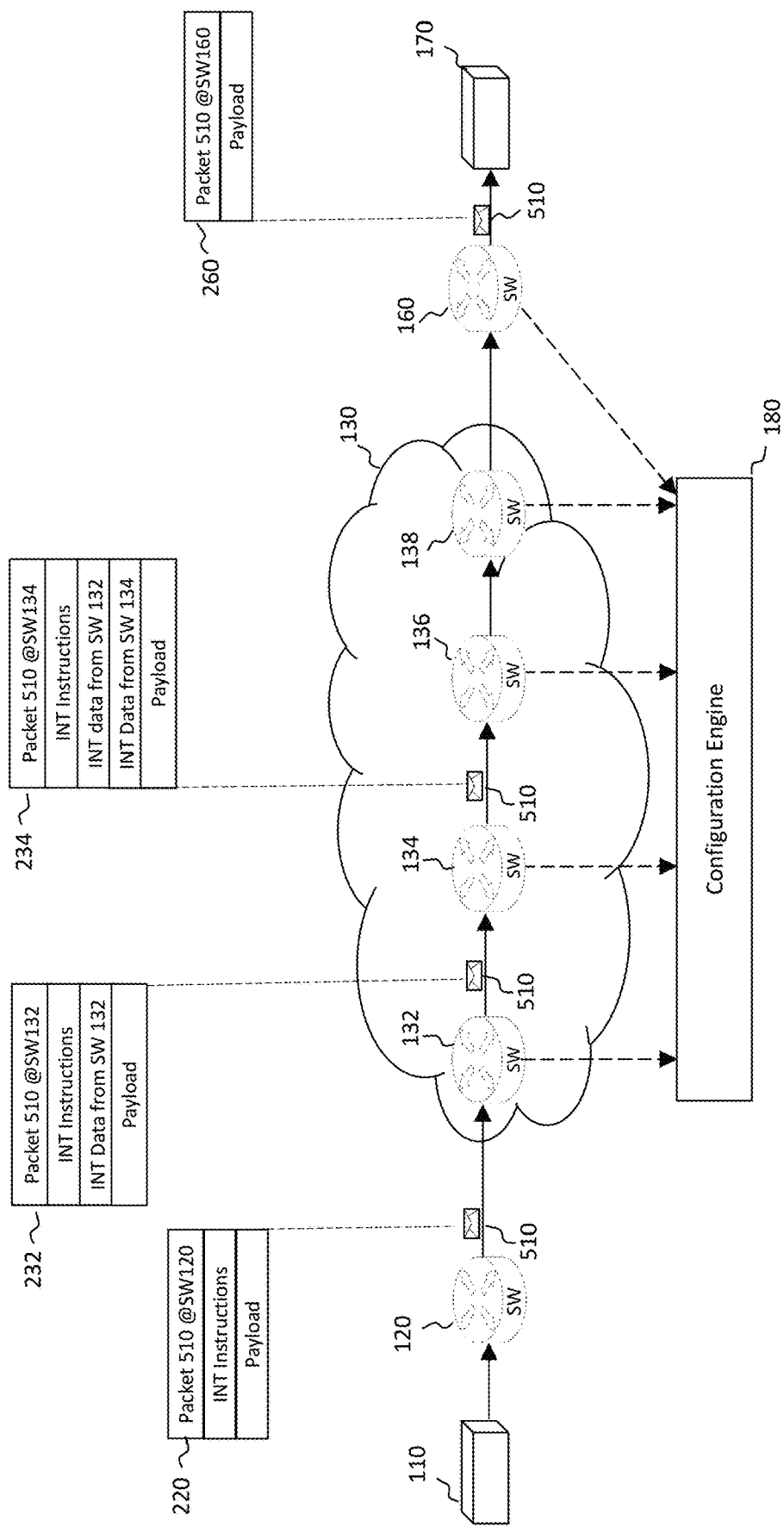
FIG. 5 shows an application of an INT configuration applied to network elements for monitoring a flow property, in accordance with some embodiments of the disclosure.

FIG. 5 depicts one exemplary application of an INT configuration applied to network elements for monitoring a flow property, in accordance with some embodiments of the disclosure. In this embodiment, the controller 230 receives packet data from each network element 120-160 in the network, sent through its flow reporting module. The packet data is then forwarded from the controller 230 to the flow analyzer 220 for further processing. The flow analyzer 220 generates a flow matrix that includes flow properties and metrics of all the packet flows in the network and then selects a top N metrics and its associated flow property. Continuing with this example, latency is selected as a metric and path (the hop-by-hop path) and destination IP address are selected as its associated flow properties.

The selected metric (latency) and its associated flow properties (path and destination IP address) are forwarded to the INT configuration engine 260, which in turn determines that among all the network elements 120, 132, 134, 136, 138, 140, 142, 144, 146, 148, 150, 160 from whom packets were received by the controller 230, only packets received from network elements 120, 132, 134, 136, 138, and 160 contained packet data related to the latency and path (the hop-by-hop path) and destination IP address, i.e., for purposes of this example, the metric and flow properties that were of interest and selected as the top N metrics to monitor.

As such, the INT configuration engine 260 automatically generates specific INT rules that are customized for latency and the path/destination address and applies the INT configuration to the selected network elements 120, 132, 134, 136, 138, and 160 such that customized flow data relating to latency and the path/destination address can be obtained leading to better network troubleshooting and enhanced performance. By configuring the network elements 120, 132, 134, 136, 138, and 160 with INT configuration, the INT configuration engine 260 transforms the network elements 120, 132, 134, 136, 138, and 160, that were configured with a first stage configuration, i.e., without a telemetry configuration, to a second stage configuration, i.e., configured for in-band telemetry.

Once the network elements 120, 132, 134, 136, 138, and 160 are configured with INT configuration, each network element collects packet data from packet 510 in accordance with the INT configured rules. For example, in this embodiment, the INT rules provide an instruction to each network element to collect time stamp data that can be used in calculating latency and congestion in the network.

As the packet 510 travels hop-by-hop to its destination, each network element encountered collects packet data according to the INT rules provided in its INT configuration. As such, next hop (Switch SW 132) receives the packet 510 and following the INT instructions, Switch SW 132 collects entry and exit time stamps at its ingress and egress points. The packet's payload is then augmented with time stamp metadata. The packet is copied and the packet and or its metadata is then sent to the controller 230.

Likewise, remaining network elements along the packet's path to its destination follow the same process of collecting time stamps and path and destination data, adding it to the payload, copying the packet and sending it to the controller 230 until the packet reaches its last hop. The INT telemetry data relating to entry and exit time stamps from each switch is used by the flow analyzer 230 to calculate latency and build the exemplary packet latency table depicted in FIG. 6.

The packet latency table 600 can be used to perform network troubleshooting at points of congestion. For example, packet latency table 600 shows that there is a slow down or potential congestion at switch SW 134. While most other switches are reporting a latency of between 5 ms-7 ms, switch SW 134 is experiencing a latency of 12 ms. Customized INT configurations on network elements allows for such detailed and customized reporting and leads to a better understanding of the network thereby allowing a network operator to pinpoint and troubleshoot latency related issues at or near switch SW 134.

Figure 7:
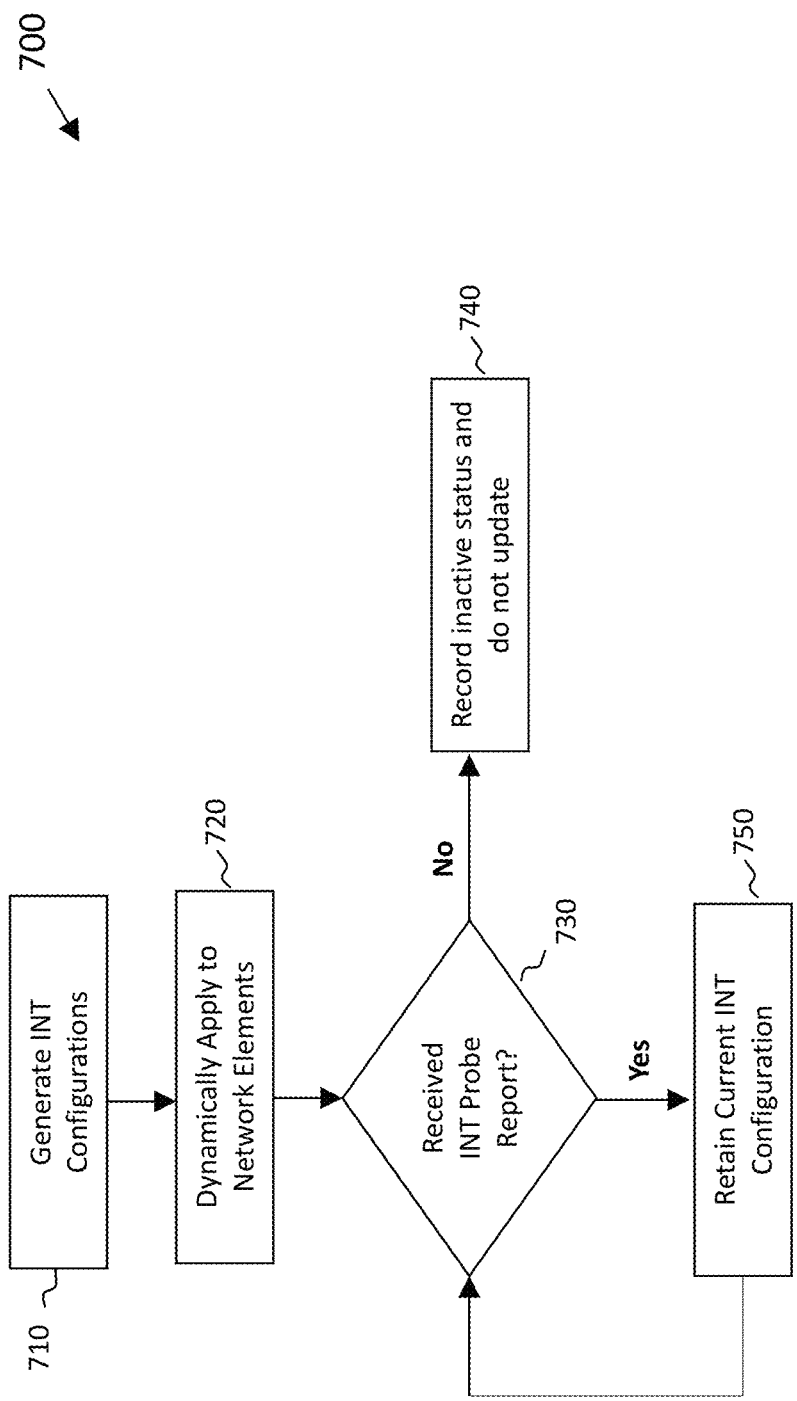
FIG. 7 is a flowchart of a process for removing an INT configuration from a network element, in accordance with some embodiments of the disclosure.

FIG. 7 shows an exemplary flowchart of a process for removing an INT configuration from a network element, in accordance with some embodiments of the disclosure. There may be instances where network elements are removed from the network 130. In other instances, network element may not be operational or replaced with other network elements. There may also be instances where a certain path in the network is no longer available. To address these types of situations, process 700 is executed to remove existing INT configurations from network elements that are no longer in use.

At step 710 the INT configuration module 260 generates an INT configuration and at step 720 dynamically configures the network switches from whom a flow property of interest was received. Once configured, the system continues to monitor the network elements that have been configured.

At step 730 a determination is made whether a probe report from each configured network element is received. Based on the configuration applied to the network elements, a probe report that identifies if the network element is currently active may be sent to the controller on a periodic basis or at predetermined time intervals.

If a probe report is not received, then it is concluded that the network element to which the INT configuration was applied is no longer active. Based on its inactive status, at Step 740 a record is made to no longer monitor and update configurations for the inactive network element. Alternatively, the prior applied configuration to the network element is removed or recorded as inactive.

If, however, a probe report is received, then it is concluded that the network element to which an INT configuration was applied remains active and as such, at step 750 the previously applied INT configuration is retained.

Figure 8:
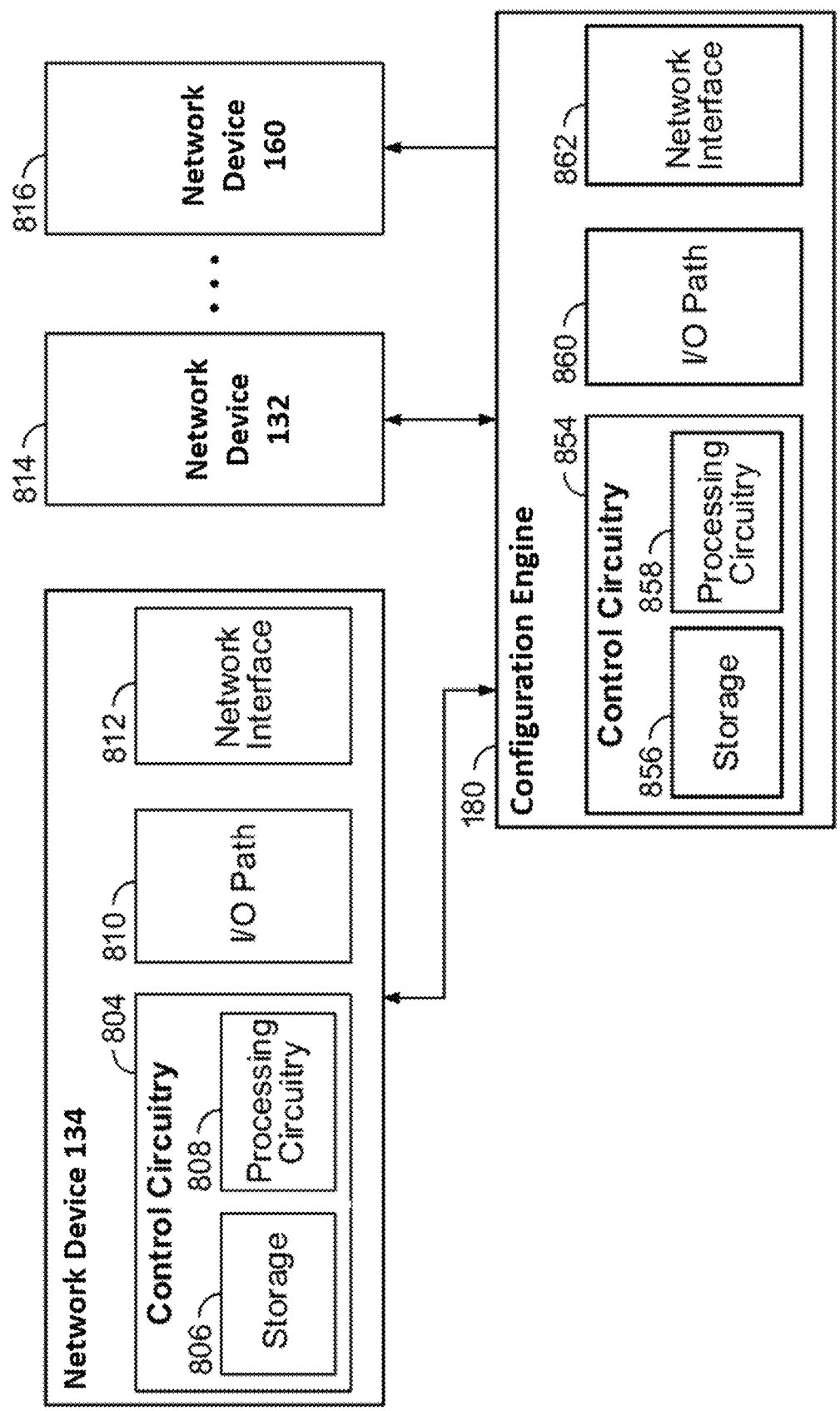
FIG. 8 shows components of a system for collecting packets data and configuring a network element for in-band telemetry, in accordance with some embodiments of the disclosure.

FIG. 8 shows a diagram of illustrative devices of a system 800 that includes network element 134, network devices 120-160, and configuration engine 180. For example, network element 134 may be the same as network element 136 or any of the network elements 120-160 in the network 130, and configuration engine 180 may be the same as configuration engine shown in FIG. 2.

Network element 134 may receive and send data via an input/output (I/O) path 810. I/O path 810 is communicatively connected to control circuitry 804, which includes processing circuitry 808 and storage (or memory) 806. Control circuitry 804 may send and receive commands, requests, and other suitable data using I/O path 810. I/O path 810 may connect control circuitry 804 (and specifically processing circuitry 808) to one or more network interfaces 812, which in turn connect network element 134 to other devices on the network (e.g., network elements 120, 132, 134, 136, 138, 140, 142, 144, 146, 148, 150, 160).

Control circuitry 804 may be based on any suitable processing circuitry, such as processing circuitry 808. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 804 executes instructions stored in memory (i.e., storage 806). For example, the instructions may cause control circuitry 804 to perform packet forwarding, telemetry, and INT operations described above and below.

Memory 806 may be an electronic storage device that is part of control circuitry 804. As referred to herein, the phrase "electronic storage device" or "storage device" should be understood to mean any device for storing electronic data, computer software, instructions, and/or firmware, such as random-access memory, hard drives, optical drives, solid state devices, quantum storage devices, or any other suitable fixed or removable storage devices, and/or any combination of the same. Nonvolatile memory may also be used. The circuitry described herein may execute instructions included in software running on one or more general purpose or specialized processors.

Control circuitry 804 may use network interface 812 to receive and forward packets to other network devices 814-816 (which may include hardware similar to that of network element 134), e.g., over any kind of a wired or wireless network. In some embodiments, network element 134, 132, and 160 may be transformed from a first stage configured network element to a second stage configured network element, where at its second stage, it has been configured to perform INT operations.

For example, memory 806 may include instructions for handling INT packets to collect and forward telemetry data as described above. In some embodiments, network element 134 may store a flow table in memory 806, where the flow table is established and updated as described above. Control circuitry may periodically forward data from the flow table to the controller 230 of the configuration engine 180, as shown in FIG. 2.

Configuration engine 180 may include I/O path 860, network interface 862, and control circuitry 854 that includes processing circuitry 858 and storage 856. These elements may function similarly to elements 804, 806, 808, 810, 812 as described above. Configuration engine 180 may be configured to receive packets, copies of packets, metadata from packets, or flow reports from the flow reporting module 210 from all switches 120, 132, 134, 136, 138, 140, 142, 144, 146, 148, 150, 160 in the network 130 via network interface 862. Once a selected number of network elements, e.g., network elements 132, 134, 136, 138, 160, have been transformed from a first stage configured network elements to a second stage configured network elements, the configuration engine 180 may be configured to receive and process INT telemetry data via network interface 862. In some embodiments, configuration engine 180 may use packets, copies of packets, metadata from packets, or flow reports received from the flow reporting module 210 from all network elements 120, 132, 134, 136, 138, 140, 142, 144, 146, 148, 150, 160 in the network 130 when the network elements 120, 132, 134, 136, 138, 140, 142, 144, 146, 148, 150, 160 have been configured for first stage and then subsequently receive INT telemetry data from a selected subset when configured to a second stage configuration to make network-wide actions and generate flow reports, such as flow summary recorded in a multi-dimensional matrix shown in FIG. 3.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The invention claimed is:

1. A method of automatically generating an in-band telemetry (INT) configuration and applying it to one or more first stage configured network elements in a plurality of first stage configured network elements in a network comprising:
   receiving, at a configuration engine, a plurality of packets from the plurality of first stage configured network elements in a network, wherein each packet includes a plurality of flow properties;

selecting one or more flow properties from the plurality of flow properties;

calculating one or more flow metrics for the selected one or more flow properties; and generating and continuously updating a multi-dimensional flow summary that is representative of a current network traffic flow based on the one or more flow properties and the one or more metrics of each flow property;

mapping the selected one or more flow properties to the one or more first stage configured network elements;

automatically generating an in-band network telemetry (INT) configuration based on the selected one or more flow properties;

configuring the one or more mapped first stage configured network elements with the INT configuration, thereby converting the one or more first stage configured network elements to one or more second stage configured network elements including INT rules for monitoring packet flow in the network; and in response to detecting a change in the multi-dimensional flow summary, automatically reconfiguring the one or more second stage configured network elements with updated INT rules to accommodate the change detected.

2. The method of claim 1, wherein the one or more flow properties is selected from a group consisting of: IP Protocol, Source IP address, Destination IP address, Source Port, Destination Port, VLAN ID, and VXLAN VNI.

3. The method of claim 1, wherein the flow metric is selected from a group of consisting of: jitter, packet loss, latency, path, hop-by-hop delay, network congestion points, queue length, and bandwidth utilization.

4. The method of claim 1, wherein mapping includes identifying the one or more first stage configured network elements that sent a packet containing the selected one or more flow properties to the configuration engine.

5. The method of claim 1, wherein at least one flow property is a field of a packet header.

6. The method of claim 1, wherein at least one flow property is a combination of one or more fields of a packet header.

7. The method of claim 1, wherein the INT rules instruct the one or more second stage configured network element to copy packets that match the INT rules and forward the copied packets to the configuration engine.

8. The method of claim 1, wherein the INT rules instruct the one or more second stage configured network element to forward metadata from packets that match the INT rules to the configuration engine.

9. The method of claim 1, further comprising:
the configuration engine determining receipt of an INT probe report from the one or more second stage configured network elements, wherein the INT probe report provides a network status of the one or more second stage configured network element; and
marking the one or more second stage configured network element as inactive if an INT probe report is not received within a period of time.

10. The method of claim 1, further comprising:
receiving packets from the one or more second stage configured network elements over a predefined period of time;
aggregating packets with a common destination to identify a service being accessed at the common destination; and generating a second INT configuration specific to monitoring the common destination.

11. The method of claim 10, wherein the service being accessed is a Domain Name System (DNS) service.

12. The method of claim 11, wherein the INT configuration for monitoring the DNS service instructs the one or more second stage configured network elements to forward packets that have a DNS server as their destination address.

13. The method of claim 1, wherein the one or more first stage configuration network element is a network element that has not been configured with the INT configuration.

14. An in-band telemetry (INT) device comprising:
at least one memory configured to store a plurality of flow properties;
a network interface configured to receive a plurality of packets from a plurality of first stage configured network elements in a network, wherein each packet includes the plurality of flow properties; and
control circuitry configured to:
select one or more flow properties from the plurality of flow properties;
calculate one or more flow metrics for the selected one or more flow properties; and
generate and continuously update a multi-dimensional flow summary that is representative of a current network traffic flow based on the one or more flow properties and the one or more metrics of each flow property;
map the selected one or more flow properties to the one or more first stage configured network elements;
automatically generate an in-band network telemetry (INT) configuration based on the selected one or more flow properties; and
configuring the one or more mapped first stage configured network elements with the INT configuration thereby converting the one or more first stage configured network elements to one or more second stage configured network elements including INT rules for monitoring packet flow in the network; and
in response to detecting a change in the multi-dimensional flow summary, automatically reconfiguring the one or more second stage configured network elements with updated INT rules to accommodate the change detected.

15. The in-band telemetry (INT) device of claim 14, wherein the one or more flow properties is selected from a group consisting of: IP Protocol, Source IP address, Destination IP address, Source Port, Destination Port, VLAN ID, and VXLAN VNI.

16. The in-band telemetry (INT) device of claim 14, wherein map the selected one or more flow properties to the one or more first stage configured network elements includes identifying the one or more first stage configured network elements that sent a packet containing the selected one or more flow properties to the INT device.

17. The in-band telemetry (INT) device of claim 14, wherein the control circuitry is further configured to:
receive packets from the one or more second stage configured network elements over a predefined period of time;
aggregate packets with a common destination to identify a service being accessed at the common destination; and
generate a second INT configuration specific to monitoring the common destination.

18. A method of automatically generating an in-band telemetry (INT) configuration and applying it to one or more first stage configured network elements in a plurality of first stage configured network elements in a network comprising:
  receiving, at a configuration engine, a plurality of packets from the plurality of first stage configured network elements in a network, wherein each packet includes a plurality of flow properties;
  selecting one or more flow properties from the plurality of flow properties;
  calculating one or more flow metrics for the selected one or more flow properties; and
  generating and continuously updating a multi-dimensional flow summary that is representative of a current network traffic flow based on the one or more flow properties and the one or more metrics of each flow property;
  mapping the selected one or more flow properties to the one or more first stage configured network elements;
  automatically generating an in-band network telemetry (INT) configuration based on the selected one or more flow properties;
  configuring the one or more mapped first stage configured network elements with the INT configuration, thereby converting the one or more first stage configured network elements to one or more second stage configured network elements including INT rules for monitoring packet flow in the network; and
  receiving packets from the second stage configured network elements over a predefined period of time;
  aggregating packets with a common destination to identify a service being accessed at the common destination; and
  generating a second INT configuration specific to monitoring the common destination.

19. The method of claim 18, wherein in response to detecting a change in the multi-dimensional flow summary, automatically reconfiguring the one or more second stage configured network elements with updated INT rules to accommodate the change detected.

20. The method of claim 18, further comprising:
  determining receipt of an INT probe report from the one or more second stage configured network elements, wherein the INT probe report provides a network status of the one or more second stage configured network element.

* * * * *